(12) United States Patent
Ozaki

(10) Patent No.: US 10,227,957 B2
(45) Date of Patent: Mar. 12, 2019

(54) AIR CLEANER STRUCTURE IN SADDLE-RIDE TYPE VEHICLE

(71) Applicant: HONDA MOTOR CO., LTD., Tokyo (JP)

(72) Inventor: Yoshinobu Ozaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 41 days.

(21) Appl. No.: 15/405,506

(22) Filed: Jan. 13, 2017

(65) Prior Publication Data

US 2017/0241381 A1 Aug. 24, 2017

(30) Foreign Application Priority Data

Feb. 22, 2016 (JP) .................................. 2016-030872

(51) Int. Cl.
| | | |
|---|---|---|
| F02M 35/02 | (2006.01) | |
| F02M 35/04 | (2006.01) | |
| B62J 99/00 | (2009.01) | |
| B60R 16/02 | (2006.01) | |
| B62K 11/04 | (2006.01) | |
| B62K 19/30 | (2006.01) | |

(52) U.S. Cl.
CPC .......... *F02M 35/0201* (2013.01); *B62J 99/00* (2013.01); *F02M 35/048* (2013.01); *B60R 16/0207* (2013.01); *B62K 11/04* (2013.01); *B62K 19/30* (2013.01)

(58) Field of Classification Search
CPC .............. F02M 35/0201; F02M 35/048; B60R 16/0207; B62K 11/04
See application file for complete search history.

(56) References Cited

U.S. PATENT DOCUMENTS

| | | | | |
|---|---|---|---|---|
| 7,431,114 B2 * | 10/2008 | Ohira | ..................... | B62K 19/46 180/219 |
| 9,016,414 B2 | 4/2015 | Shimomura et al. | | |
| 2005/0133289 A1 * | 6/2005 | Nakano | ................ | F02M 35/048 180/219 |

(Continued)

FOREIGN PATENT DOCUMENTS

| | | |
|---|---|---|
| JP | 2013-155721 A | 8/2013 |
| JP | 2014-065469 A | 4/2014 |

(Continued)

OTHER PUBLICATIONS

Japanese Office Action application No. 2016-030872 dated Jul. 26, 2017.

*Primary Examiner* — Joseph M Rocca
*Assistant Examiner* — Marlon A Arce
(74) *Attorney, Agent, or Firm* — Squire Patton Boggs (US) LLP

(57) ABSTRACT

In a saddle-ride type vehicle in which a cleaner case of an air cleaner is configured with first and second case half bodies coupled to each other and arranged in a vehicle width direction, and is arranged in a space surrounded by a vehicle body frame, a first case half body is provided with: a cleaner element insertion/removal port opened outward so as to permit insertion and removal of a cleaner element therethrough; a purified air outlet connected with a connecting tube for guiding purified air to an engine body side; and an outside air suction port for introducing air from an outside into the cleaner case.

9 Claims, 13 Drawing Sheets

(56) References Cited

U.S. PATENT DOCUMENTS

| | | | |
|---|---|---|---|
| 2013/0220259 A1* | 8/2013 | Ozaki | F02M 35/10091 123/184.21 |
| 2014/0060952 A1* | 3/2014 | Mizukura | B62M 7/00 180/231 |
| 2015/0101558 A1* | 4/2015 | Shimozato | F02M 35/162 123/184.21 |
| 2015/0107563 A1* | 4/2015 | Naruoka | F02M 35/14 123/559.1 |
| 2015/0275833 A1* | 10/2015 | Arima | F02B 39/04 123/559.1 |
| 2016/0076494 A1* | 3/2016 | Nishimura | B62K 11/00 180/219 |
| 2017/0152821 A1* | 6/2017 | Yamamoto | F02M 35/162 |

FOREIGN PATENT DOCUMENTS

| | | |
|---|---|---|
| JP | 2014-196043 A | 10/2014 |
| JP | 2015045244 A | 3/2015 |
| JP | 2015045245 A | 3/2015 |
| JP | 2016-005946 A | 1/2016 |
| WO | 2014050489 A1 | 4/2014 |
| WO | WO2014050489 * | 4/2014 |

* cited by examiner

AIR CLEANER STRUCTURE IN SADDLE-RIDE TYPE VEHICLE

BACKGROUND OF THE INVENTION

Field of the Invention

The present invention relates to a saddle-ride type vehicle comprising a vehicle body frame, an air cleaner and an engine body, the air cleaner and the engine body being mounted within the vehicle body frame, the air cleaner having a cleaner element stored in a cleaner case, the cleaner case being configured with first and second case half bodies coupled to each other and arranged in a vehicle width direction, the cleaner case being arranged in a space surrounded by the vehicle body frame, the engine body being at least partially arranged in front of the air cleaner in a vehicle longitudinal direction. The present invention particularly relates to an improvement of an air cleaner structure in the saddle-ride type vehicle.

Description of the Related Art

Such an air cleaner structure in a saddle-ride type vehicle is known in Japanese Patent Application Laid-open No. 2014-196043 that a cleaner case for an air cleaner arranged rearward of an engine body is configured with a pair of case half bodies coupled to each other while being arranged in a vehicle width direction, the cleaner case being arranged in a space surrounded by a vehicle body frame, and a cleaner element insertion/removal port configured so that a cleaner element stored in the cleaner case can be inserted into and removed from the cleaner element insertion/removal port is provided to one of the pair of case half bodies.

In the air cleaner structure for the saddle-ride type vehicle disclosed in Japanese Patent Application Laid-open No. 2014-196043, the cleaner element insertion/removal port is provided in a front portion of one of the case half bodies, the front portion being arranged along a vehicle longitudinal direction, and the cleaner element insertion/removal port is opened unilaterally obliquely forward in the vehicle width direction, and the cleaner element can be inserted into and removed from the cleaner case from one side in the vehicle width direction. However, a purified air outlet capable of being connected with a connecting tube for leading purified air to the engine body side is provided in the other of the pair of case half bodies. Therefore, when enlarging a passage leading the purified air from the air cleaner to the engine body side, the air cleaner structure for the saddle-ride type vehicle disclosed in Japanese Patent Application Laid-open No. 2014-196043 has a problem causing complication of a cleaner case structure.

SUMMARY OF THE INVENTION

The present invention has been achieved under the above-mentioned circumstances, and an object of the present invention is to provide an air cleaner structure in a saddle-ride type vehicle configured to be able to contribute to an improvement in engine performance by enhancing a degree of freedom in arrangement of a purified air passage to an engine body side and a shape of the purified air passage while facilitating inserting and removing work of a cleaner element from a vehicle lateral side.

In order to achieve the object, according to a first feature of the present invention, there is provided an air cleaner structure in a saddle-ride type vehicle, the saddle-ride type vehicle comprising a vehicle body frame, an air cleaner and an engine body, the air cleaner and the engine body being mounted within the vehicle body frame, the air cleaner having a cleaner element stored in a cleaner case, the cleaner case being configured with first and second case half bodies coupled to each other and arranged in a vehicle width direction, the cleaner case being arranged in a space surrounded by the vehicle body frame, the engine body being at least partially arranged in front of the air cleaner in a vehicle longitudinal direction, wherein the first case half body of the first and second case half bodies is provided with a cleaner element insertion/removal port, a purified air outlet, and an outside air suction port, the cleaner element insertion/removal port being opened outward so that the cleaner element can be inserted into and removed from the cleaner element insertion/removal port, the purified air outlet being connected with a connecting tube for guiding purified air to the engine body side, the outside air suction port configured to introduce air from an outside into the cleaner case.

With the first feature of the present invention, the cleaner element insertion/removal port opened outward so that the cleaner element can be inserted into and removed from the cleaner element insertion/removal port is formed in the first case half body configuring the cleaner case in cooperation with the second case half body, and the purified air outlet and the outside air suction port is also formed in the first case half body. For this reason, the present invention can contribute to an improvement in engine performance by enhancing a degree of freedom in arrangement and a shape of a passage leading the purified air to the engine body side while achieving easy insertion and removal of the cleaner element from the vehicle lateral side and avoiding complication of the cleaner case structure.

According to a second feature of the present invention, in addition to the first feature, a rear portion of the first case half body in the vehicle longitudinal direction is provided with an enlarged portion, the enlarged portion being enlarged to the second case half body side so that a rear portion of a joint portion for the first and second case half bodies is formed into a substantially L-shaped bent portion as seen in a plan view, and the outside air suction port is formed in a bottom surface of a recessed portion, the recessed portion being formed in the enlarged portion while being opened rearward and upward in the vehicle longitudinal direction.

With the second feature of the present invention, the rear portion of the first case half body in the vehicle longitudinal direction is provided with the enlarged portion, the enlarged portion being enlarged to the second case half body side so that the rear portion of the joint portion for the first and second case half bodies is formed into the substantially L-shaped bent portion as seen in the plan view, and the outside air suction port is formed in the bottom surface of the recessed portion, the recessed portion being formed in the enlarged portion while being opened upward and rearward in the vehicle longitudinal direction. For this reason, the outside air suction port can be protected by the vehicle body frame and the cleaner case itself, and also a volume of the non-purifying chamber placed farther upstream of the cleaner element in the cleaner case is increased so as to reduce an intake noise.

According to a third feature of the present invention, in addition to the first or second feature, the cleaner element striding over the first and second case half bodies is stored in the cleaner case so that a part of a non-purifying chamber placed farther upstream of the cleaner element is formed in the enlarged portion.

With the third feature of the present invention, the large cleaner element striding over the first and second case half bodies can be used. For this reason, the present invention can contribute to an improvement in service life of the cleaner element.

According to a fourth feature of the present invention, in addition to the third feature, an element supporting wall portion supporting the cleaner element is provided integrally with the first case half body of the first and second case half bodies so that a part of the element supporting wall portion is projected into the second case half body, the cleaner element is formed into a plate shape so as to direct an air flowing direction along the vehicle longitudinal direction with the cleaner element supported by the element supporting wall portion of the cleaner case mounted within the vehicle body frame, and a purifying chamber space having a substantially L-shaped cross-section is formed between the element supporting wall portion and the cleaner case, the purifying chamber space functioning as a part of a purifying chamber formed in the cleaner case on a downstream side of the cleaner element.

With the fourth feature of the present invention, the cleaner element is supported by the element supporting wall portion provided integrally with the first case half body only so that the part of the element supporting wall portion is projected into the second case half body. For this reason, an improvement in air suction performance can be achieved while ensuring sealability between the cleaner element and the cleaner case and ensuring a volume of the purifying chamber.

According to a fifth feature of the present invention, in addition to the first or second feature, a second purified air outlet is formed in the second case half body, and a second connecting tube is connected to the second purified air outlet, the second connecting tube leading the purified air toward a multiple cylinder engine body.

With the fifth feature of the present invention, the cleaner case is configured by joining the second case half body formed with the second purified air outlet to the first case half body used for the single cylinder engine. For this reason, the present invention can be easily applied to a two cylinder engine body.

According to a sixth feature of the present invention, in addition to the first feature, a storage recessed portion is formed in an outer surface of a cover member while being recessed inward, the cover member being detachably attached to the first case half body so as to close the cleaner element insertion/removal port, the storage recessed portion being configured to store and retain a vehicle auxiliary machine therein.

With the sixth feature of the present invention, the storage recessed portion storing and retaining the vehicle auxiliary machine therein is formed in the outer surface of the cover member for closing the cleaner element insertion/removal port, while the storage recessed portion being recessed inward. For this reason, rigidity of the cover member can be ensured, and also a vehicle body can be miniaturized while suppressing protrusion of the vehicle auxiliary machine in the vehicle width direction.

According to a seventh feature of the present invention, in addition to the second feature, a part of the vehicle body frame is configured with a pair of frame members, the pair of frame members extending in the vehicle longitudinal direction while being arranged to approach each other above the cleaner case, and an upper surface of the cleaner case is formed with a pair of frame relief recessed portions, the pair of frame relief recessed portions storing at least a part of a portion of the pair of frame members, the portion thereof being arranged above the cleaner case.

With the seventh feature of the present invention, the upper surface of the cleaner case is formed with the pair of frame relief recessed portions, the pair of frame relief recessed portions storing at least a part of the pair of frame members extending in the vehicle longitudinal direction while being arranged to approach each other above the cleaner case as seen in the plan view. For this reason, the frame member can be arranged close to the cleaner case, and riding comfortableness can be improved while ensuring striding performance for a rider.

According to an eighth feature of the present invention, in addition to the seventh feature, an upper surface of at least one of the first and second case half bodies is formed with a wire harness relief recessed portion, the wire harness relief recessed portion storing a part of a wire harness while allowing passage of a part of the wire harness between at least one of the first and second case half bodies and at least one of the pair of frame members.

With the eighth feature of the present invention, the upper surface of at least one of the first and second case half bodies is formed with the wire harness relief recessed portion, and a part of the wire harness passing between at least one of the first and second case half bodies and at least one of the pair of frame members is stored in the wire harness relief recessed portion. For this reason, the frame member can be arranged closer to the cleaner case while ensuring the space for passing the wire harness therethrough, and the riding comfortableness can be further improved while ensuring the striding performance for the rider.

According to a ninth feature of the present invention, in addition to the second feature, the cleaner case is arranged in front of a battery box in the vehicle longitudinal direction so that the recessed portion is covered by the battery box from a rear side, the battery box being mounted within the vehicle body frame.

With the ninth feature of the present invention, the recessed portion formed in the rear portion of the cleaner case is covered with the battery box arranged behind the cleaner case in the vehicle longitudinal direction. For this reason, intake noise generation can be suppressed by shielding, by the battery box, the intake noise emitted from the outside air suction port formed in the bottom portion of the recessed portion.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Figure 1:
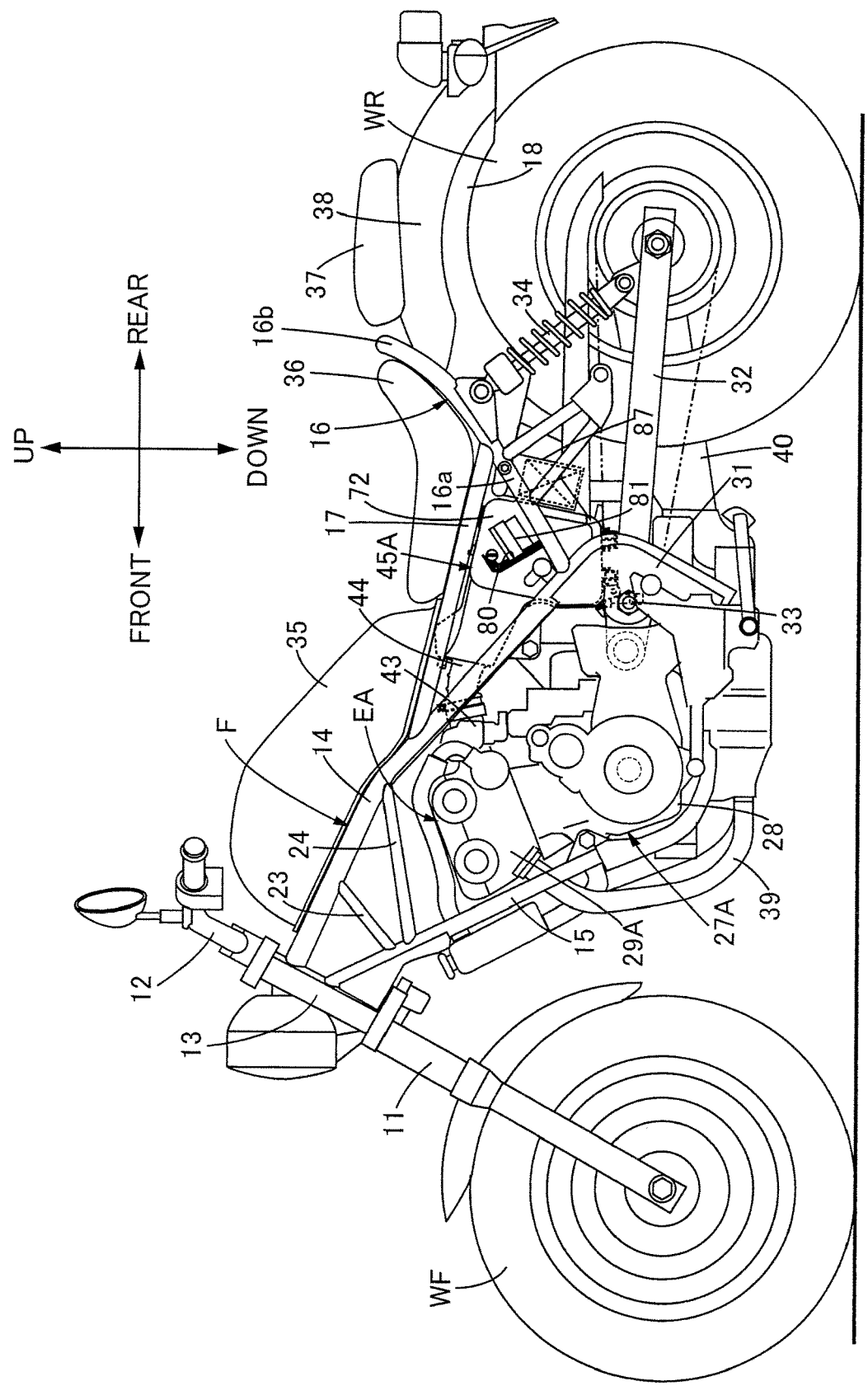
FIG. 1 is a left side view of a two-wheeled motor vehicle of a first embodiment.
Figure 2:
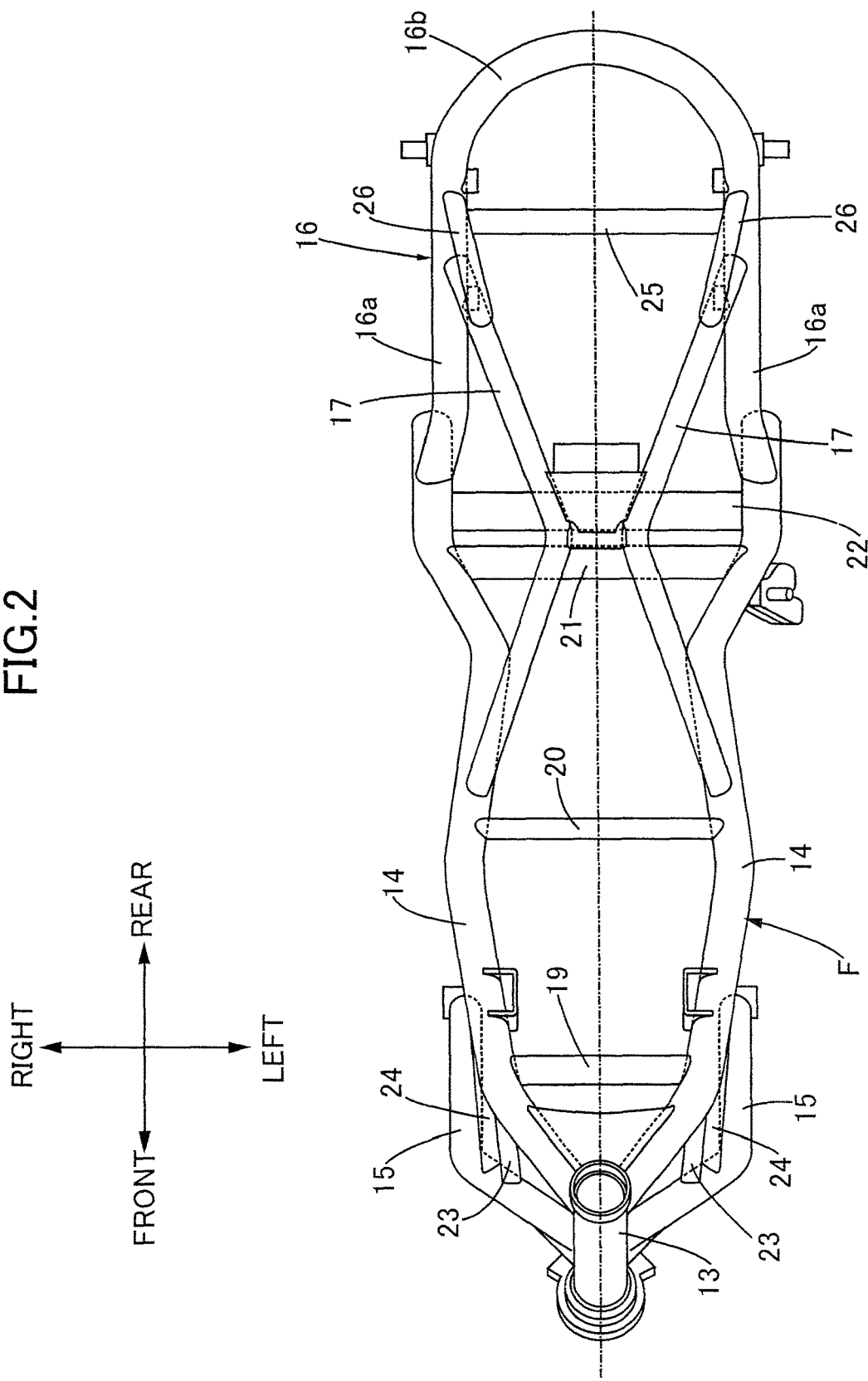
FIG. 2 is a plan view of a vehicle body frame except a rear frame.

Embodiments of the present invention will be described below with reference to accompanying drawings. Note that in the following explanation, each direction such as front and rear, upper and lower, and right and left is a direction when viewed from an occupant riding on a two-wheeled motor vehicle.

A first embodiment of the present invention will be described with reference to FIG. 1 to FIG. 10. Firstly, in FIG. 1 and FIG. 2, a vehicle body frame F for the two-wheeled motor vehicle as a saddle-ride type vehicle is provided with a head pipe 13, a pair of right and left main frames 14, a pair of right and left down frames 15, a seat frame 16, a pair of right and left seat sub-frames 17, and a pair of right and left rear frames 18. The head pipe 13 steerably supports a steering handlebar 12 and a front fork 11 pivotally supporting a front wheel WF. The pair of right and left main frames 14 is continuously provided to an upper portion of the head pipe 13 and extends rearward and downward. The pair of right and left down frames 15 is continuously provided to a lower portion of the head pipe 13 and extends rearward and downward at an angle steeper than the main frames 14. The seat frame 16 is configured in such a manner that rear ends of a pair of right and left lateral pipes 16a is integrally coupled to a substantially C-shaped coupling pipe 16b, the pair of right and left lateral pipes 16a having front ends respectively continuously provided to lower portions of the pair of right and left main frames 14, the pair of right and left lateral pipes 16a extending rearward and upward, the coupling pipe 16b opening forward and obliquely downward in a vehicle body longitudinal direction. The pair of right and left seat sub-frames 17 has front ends continuously provided to intermediate portions of the pair of right and left main frames 14 along the vehicle body longitudinal direction, the pair of right and left seat sub-frames 17 is moderately inclined rearward and downward, and the pair of right and left seat sub-frames 17 also has rear ends continuously provided to intermediate portions of the lateral pipes 16a of the seat frame 16 along the vehicle body longitudinal direction. The pair of right and left rear frames 18 is continuously provided to the seat frame 16, and extends rearward.

First, second, third and fourth cross frames 19, 20, 21, 22 are disposed at intervals in order from a front side along the vehicle body longitudinal direction between the pair of right and left main frames 14. A reinforcing frame 23 and a reinforcing frame 24 are provided respectively between two positions on the main frame 14 separated from each other in the front-rear direction and two positions on the down frame 15 separated from each other in the front-rear direction. Also, a fifth cross frame 25 is provided between the pair of right and left lateral pipes 16a of the seat frame 16, and reinforcing frames 26 are respectively provided between rear portions of the seat sub-frames 17 and rear portions of the lateral pipes 16a.

Figure 3:
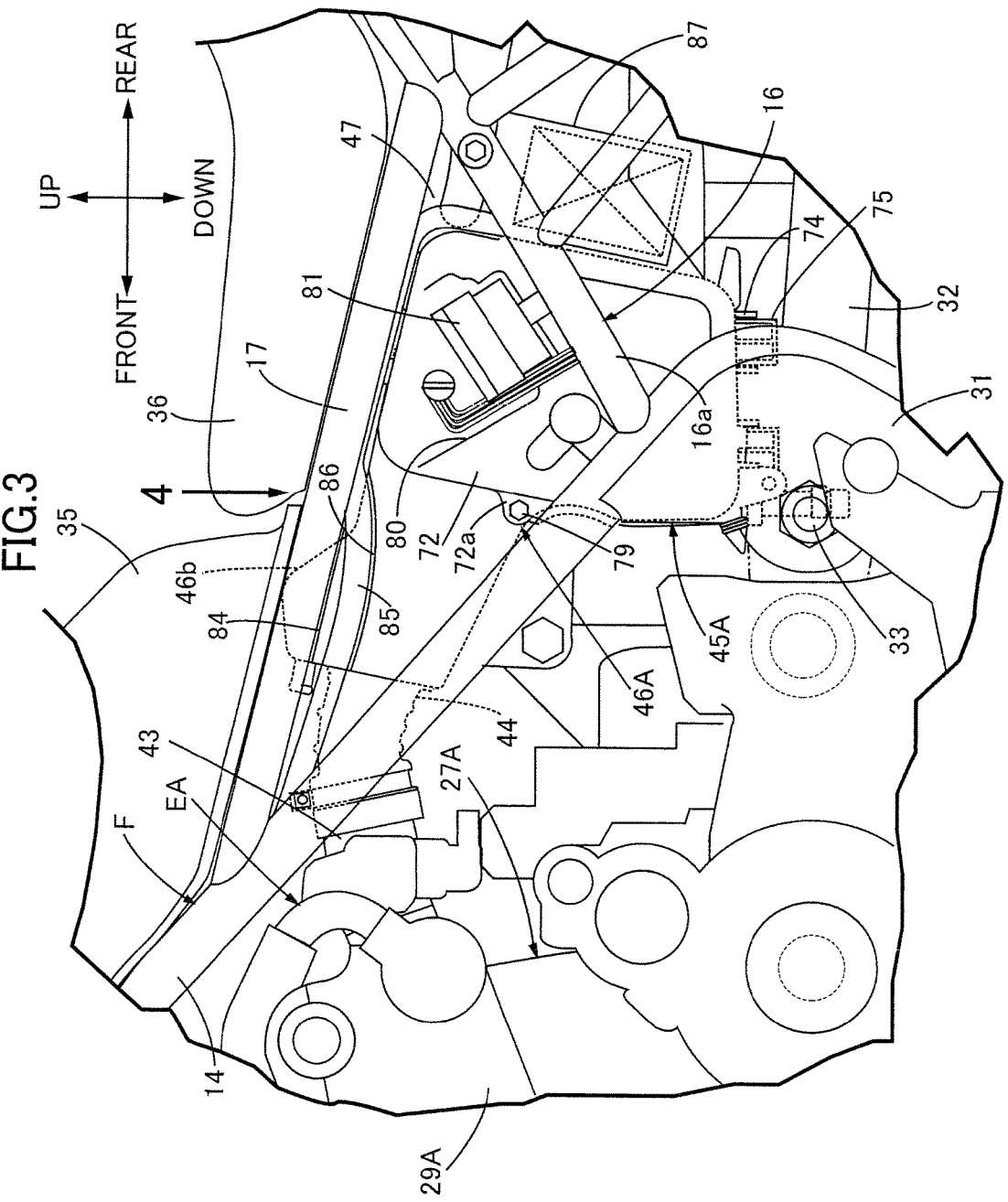
FIG. 3 is an enlarged view of a main part in FIG. 1.
Figure 4:
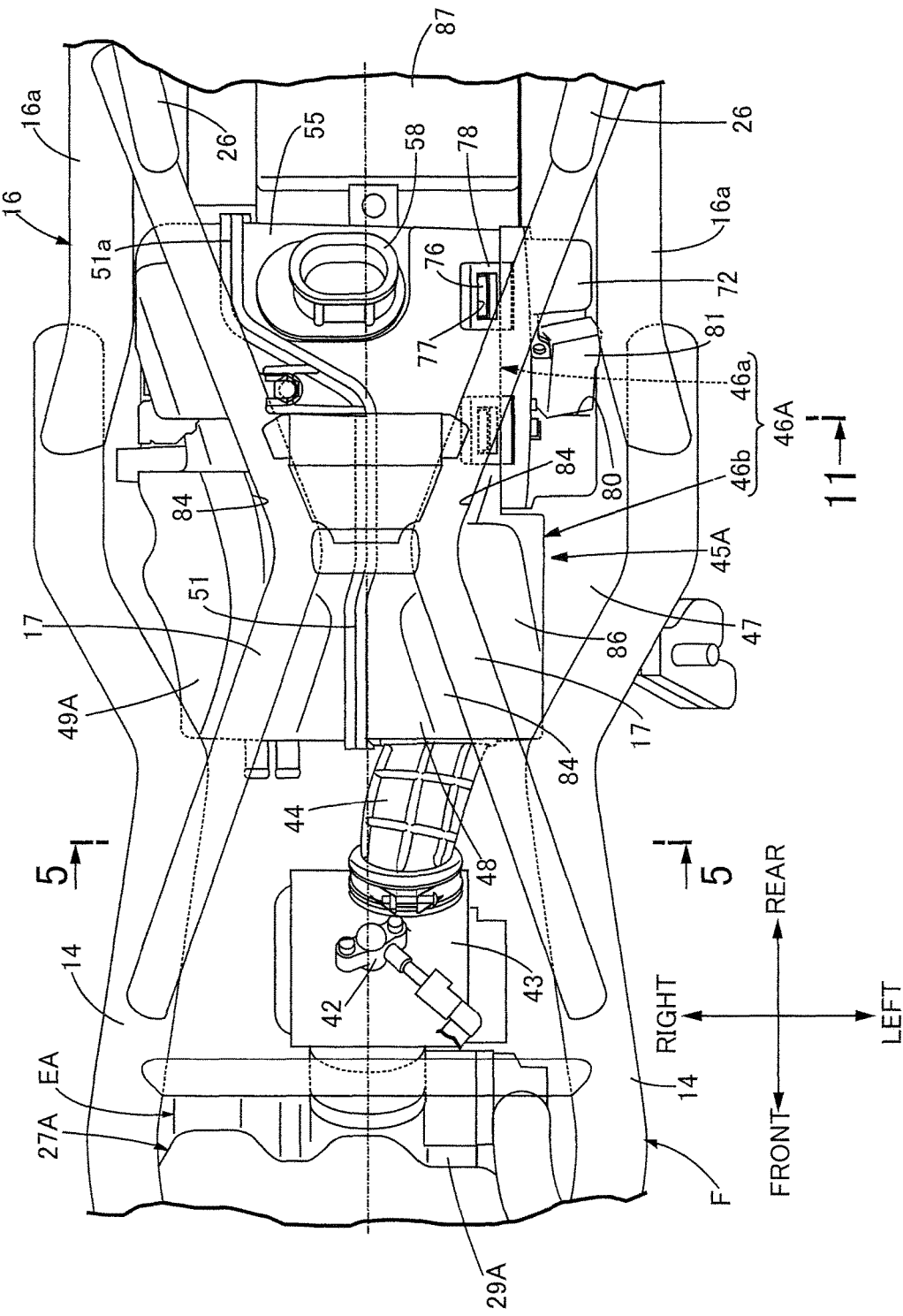
FIG. 4 is a view from arrow 4 in FIG. 3.
Figure 5:
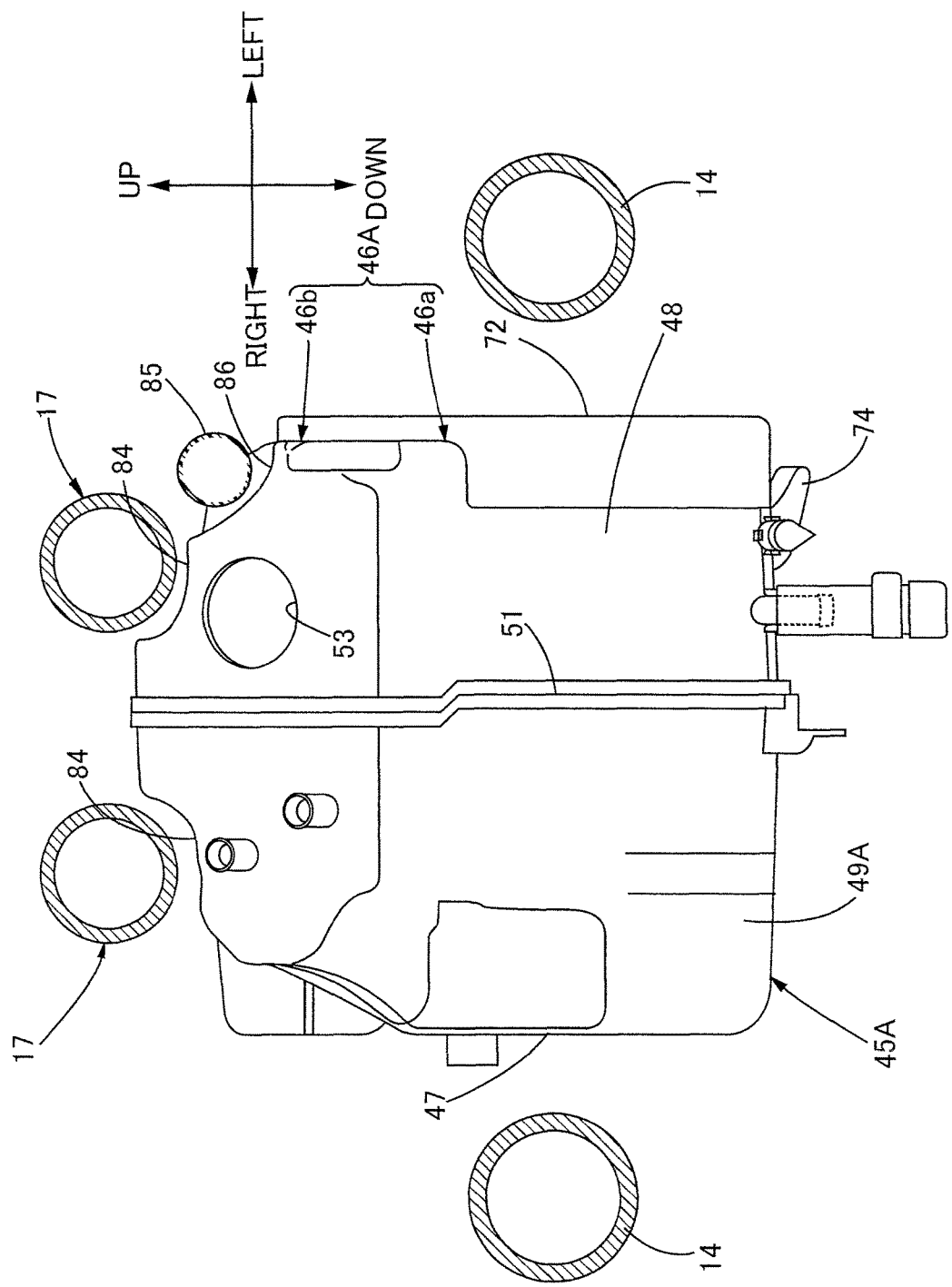
FIG. 5 is a sectional view along line 5-5 in FIG. 4.
Figure 6:
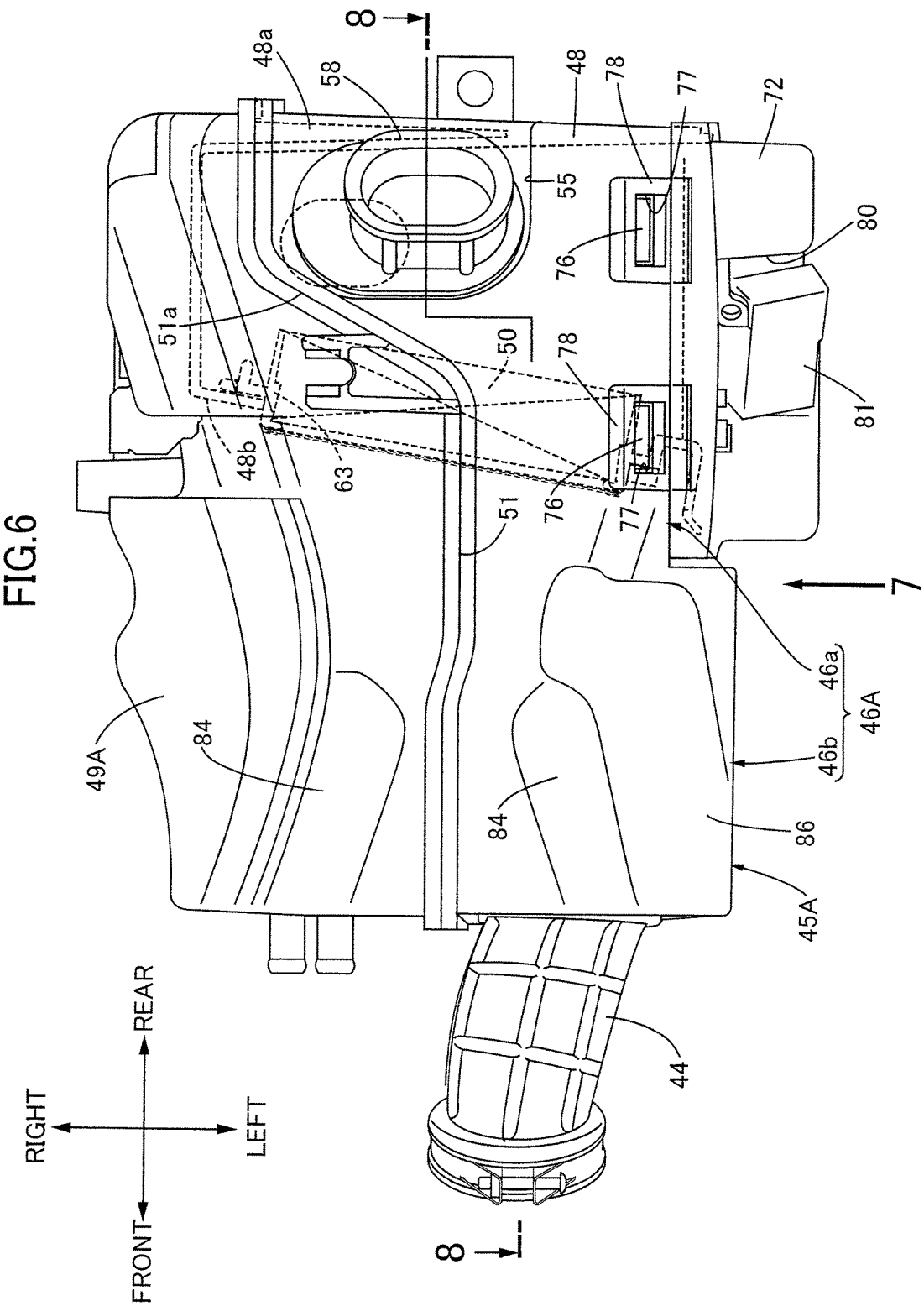
FIG. 6 is a plan view of an air cleaner.
Figure 7:
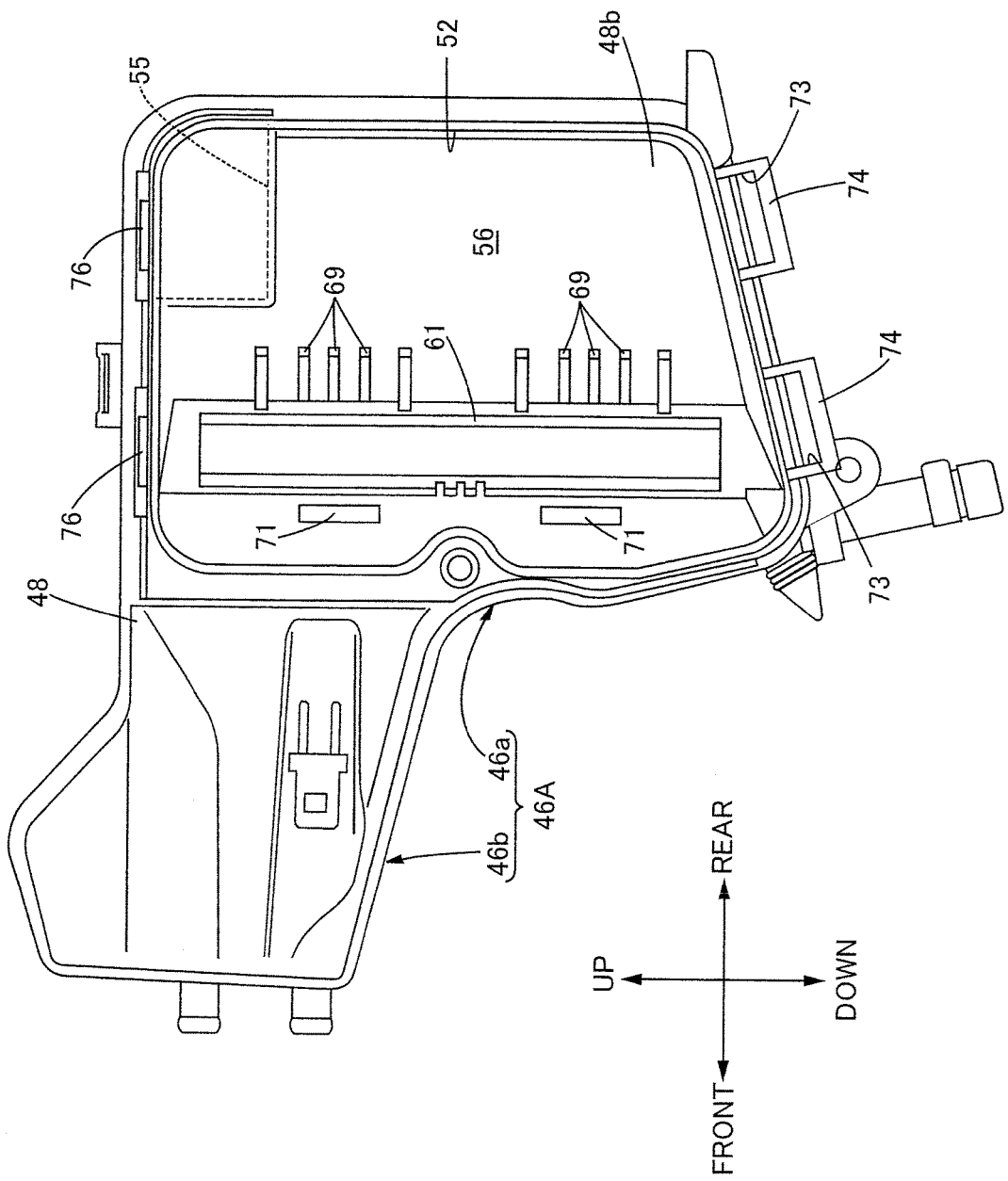
FIG. 7 is a view of a cleaner case from a direction of arrow 7 in FIG. 6, the cleaner case being in a state where a cover member and a cleaner element are omitted.
Figure 8:
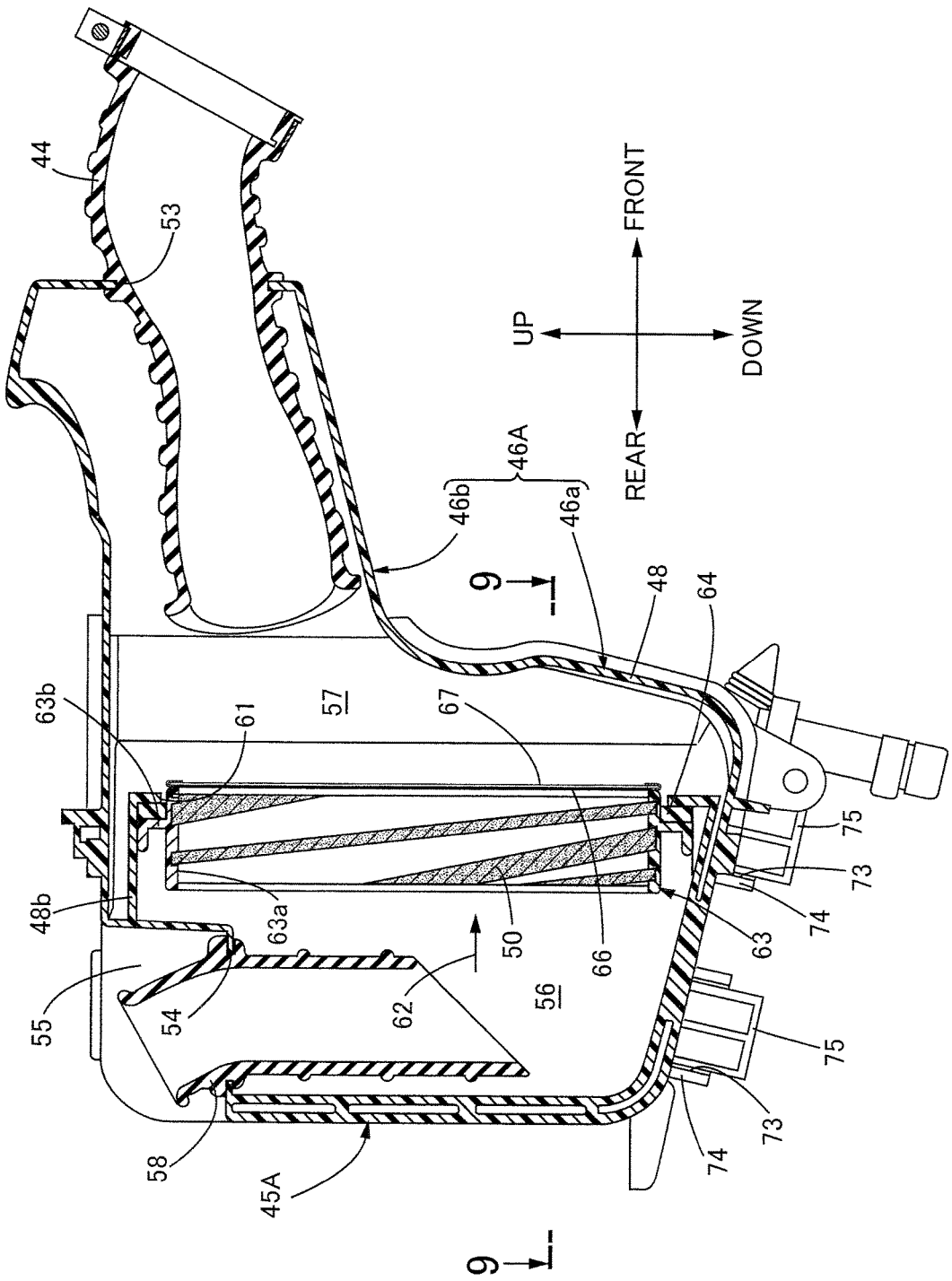
FIG. 8 is a sectional view along line 8-8 in FIG. 6.

With reference to FIG. 3 and FIG. 4 together, an engine body 27A of a single cylinder engine EA mounted within the vehicle body frame F is supported on the main frames 14 and the down frames 15 included in the vehicle body frame F. Also, a front end of a swing arm 32 is swingably supported through a spindle 33 by a bracket 31, the bracket 31 being provided to lower portions of the main frames 14, the swing arm 32 having a rear end pivotally supporting a rear wheel WR. A rear cushion unit 34 is provided between the seat frame 16 and the swing arm 32. Also, a fuel tank 35 arranged above the engine body 27A is supported on the main frames 14. A riding seat 36 is supported on the seat frame 16, the riding seat 36 being configured to put an occupant thereon and being arranged behind the fuel tank 35. Further, a rear fender 38 is attached to the pair of right and left rear frames 18, the rear fender 38 covering the rear wheel WR from above. A pillion passenger seat 37 is provided on the rear fender 38, the pillion passenger seat 37 being arranged behind the riding seat 36 so as to put the pillion passenger thereon.

An exhaust pipe 39 extends rearward through a lower side of the engine body 27A, and is connected to an exhaust muffler 40, the exhaust pipe 39 having an upstream end connected to a front side wall of a cylinder head 29A of the engine body 27A, the exhaust muffler 40 being arranged rightward of the rear wheel WR.

A throttle body 43 provided with a fuel injection valve 42 is connected to a rear side wall of the cylinder head 29A. The throttle body 43 is connected to an air cleaner 45A through a connecting tube 44.

At least a part of the engine body 27A, most of the engine body 27A excluding a crankcase 28 in the embodiment is arranged in front of the air cleaner 45A. In addition, a cleaner case 46A for the air cleaner 45A is arranged in a space 47 surrounded by the main frames 14, the seat frame 16, and the seat sub-frames 17 included in the vehicle body frame F.

With reference to FIG. 5 to FIG. 8 together, the cleaner case 46A is configured in such a manner that the first and second case half bodies 48, 49A arranged in the vehicle width direction are coupled to each other. In the embodiment, the synthetic resin first case half body 48 and the second case half body 49A are coupled to each other by frictionally joining opposed edge portions of the case half bodies 48, 49A to each other, the first case half body 48 being arranged on a left side in the vehicle width direction, the second case half body 49A being arranged on a right side in the vehicle width direction. The cleaner case 46A is formed to have a rectangular box-shaped cleaner case main portion 46a and an extension portion 46b, the cleaner case main portion 46a being configured to store and arrange the cleaner element 50 therein, the extension portion 46b extending forward from a front upper portion of the cleaner case main portion 46a arranged along the vehicle body longitudinal direction.

A joint portion 51 for the first and second case half bodies 48, 49A is basically arranged along the vehicle body longitudinal direction. An enlarged portion 48a enlarged to the second case half body 49A side is provided to the first case half body 48 so that a rear portion of the joint portion 51 is formed into a substantially L-shaped bent portion 51a as seen in a plan view.

The first case half body 48 of the first and second case half bodies 48, 49A is provided with a cleaner element insertion/removal port 52, a purified air outlet 53, and an outside air suction port 54. The cleaner element insertion/removal port 52 is opened outward (leftward in the embodiment) so that the cleaner element 50 can be inserted into and removed from the cleaner case main portion 46a. The purified air outlet 53 is connected with the connecting tube 44. The outside air suction port 54 is configured to introduce air from the outside into the cleaner case 46A.

In the embodiment, in a portion corresponding to a rear half portion of the cleaner case main portion 46a in the vehicle body longitudinal direction, the quadrangular cleaner element insertion/removal port 52 is provide in a side surface of the first case half body 48, and corresponding to a front end of the extension portion 46b in the vehicle body longitudinal direction, the purified air outlet 53 is provided in a front end surface of the first case half body 48. Also, a recessed portion 55 opened rearward and upward in the vehicle body longitudinal direction is formed in a rear upper surface of the enlarged portion 48a of the first case half body 48 in the vehicle body longitudinal direction, and the outside air suction port 54 is provided in a bottom surface of the recessed portion 55.

Figure 9:
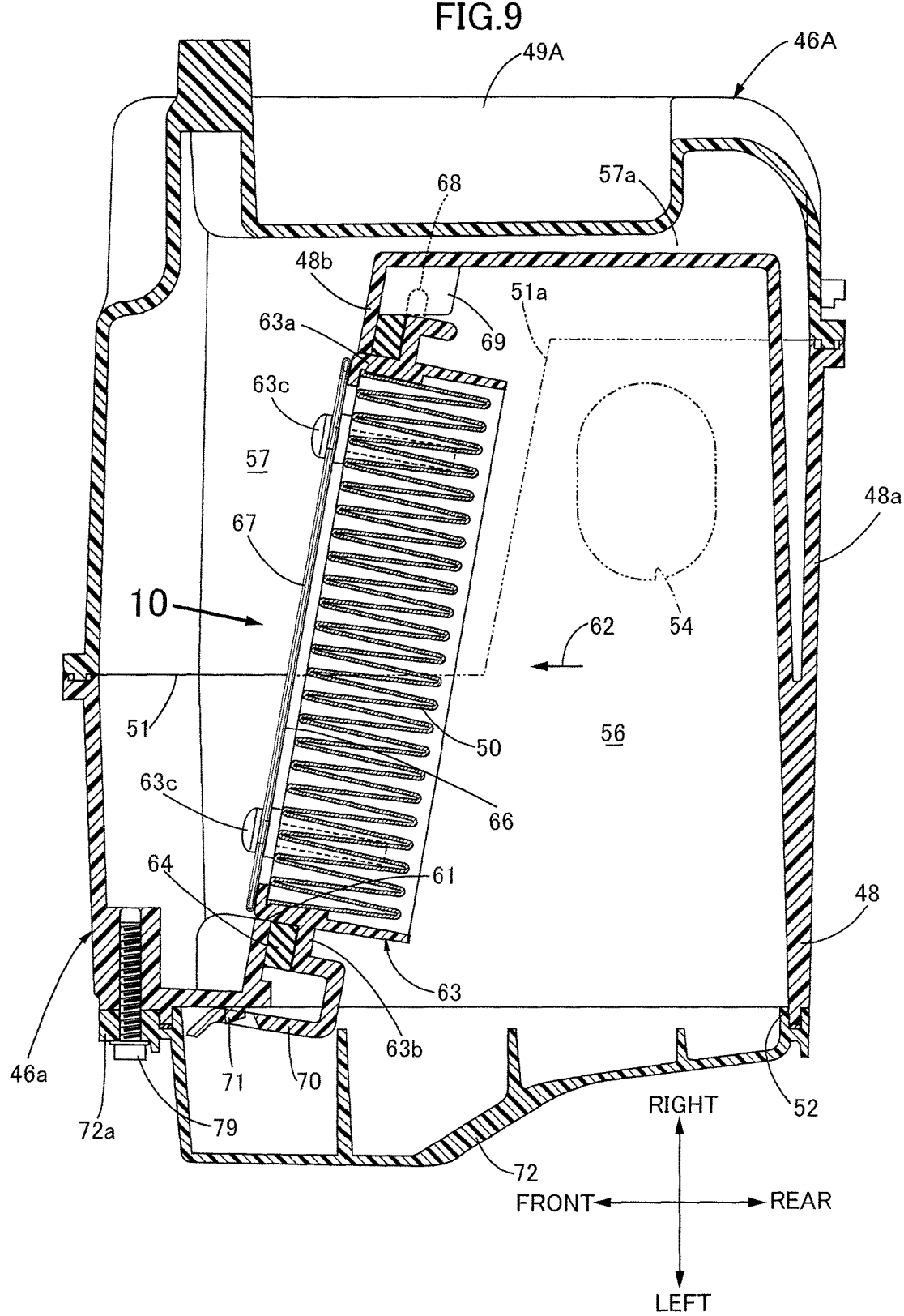
FIG. 9 is a sectional view along line 9-9 in FIG. 8.

With reference to FIG. 9 together, a non-purifying chamber 56 arranged on an upstream side of the cleaner element 50 is formed in the first case half body 48 in a portion corresponding to the cleaner case main portion 46a. A part of the non-purifying chamber 56 is formed by the enlarged portion 48a of the first case half body 48.

An intermediate portion in a longitudinal direction of an intake duct 58 for sucking air from the outside is connected to the outside air suction port 54 so that one end portion of the intake duct 58 is projected into the non-purifying chamber 56. The other end of the intake duct 58 extends rearward and obliquely upward from the bottom surface of the recessed portion 55 in the recessed portion 55 in order not to protrude upward from the cleaner case 46A as seen in a side view.

A purifying chamber 57 arranged on a downstream side of the cleaner element 50 is formed in the cleaner case 46A. The intermediate portion in the longitudinal direction of the connecting tube 44 is connected to the purified air outlet 53 so that one end portion of the connecting tube 44 is projected into the purifying chamber 57.

Figure 10:
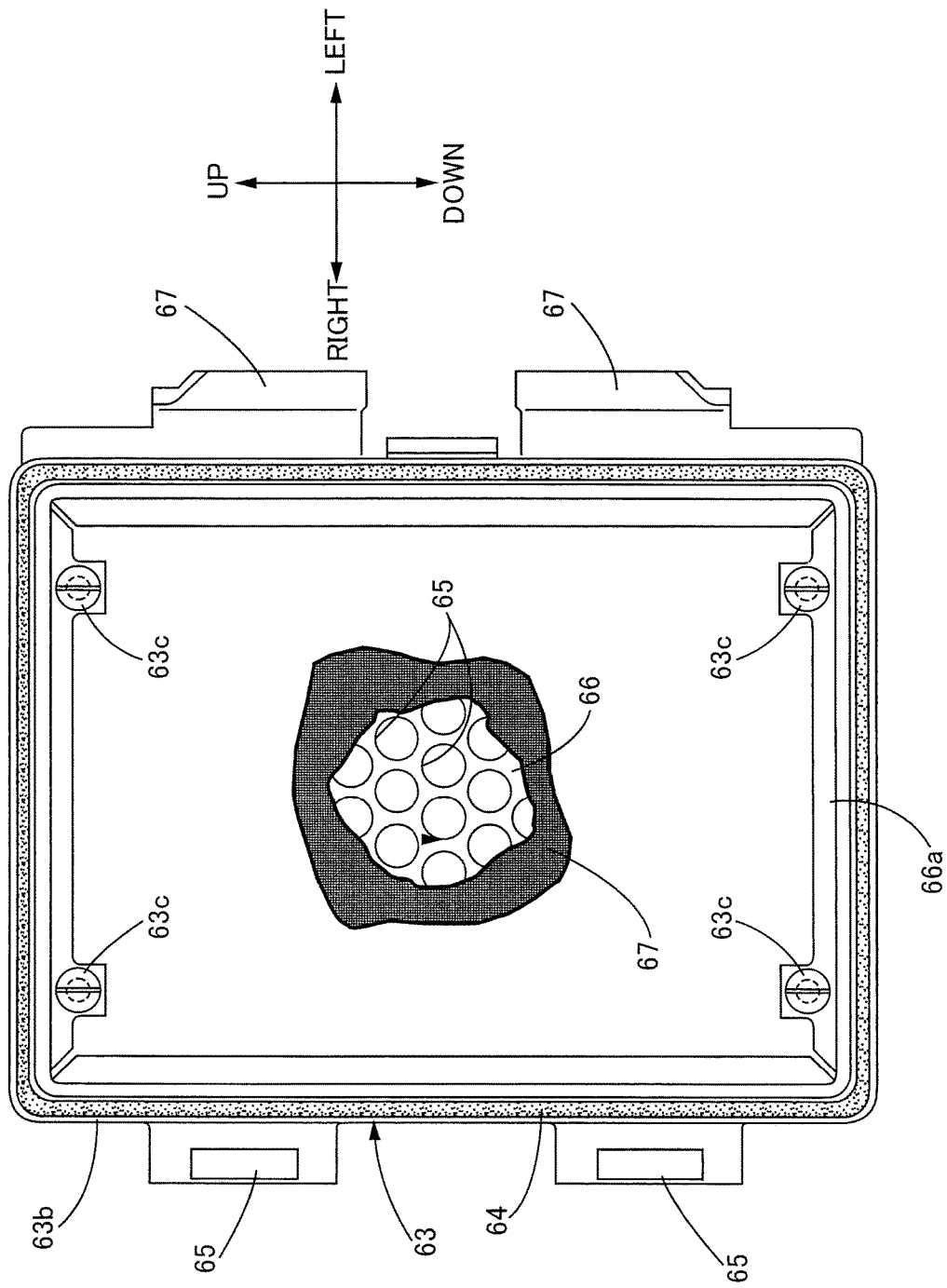
FIG. 10 is a view from arrow 10 in FIG. 9.

With reference to FIG. 10 together, an element supporting wall portion 48b is provided integrally with the first case half body 48 of the first and second case half bodies 48, 49A so that a part of the element supporting wall portion 48b is projected into the second case half body 49A, the element supporting wall portion 48b supporting a peripheral edge portion of the cleaner element 50. The element supporting wall portion 48b is provided with a rectangular opening 61 arranged between the non-purifying chamber 56 and the purifying chamber 57. In addition, the element supporting wall portion 48b is provided integrally with the first case half body 48 with a part of the element supporting wall portion 48b being projected into the second case half body 49A side so that a purifying chamber space 57a having a substantially L-shaped cross-section is formed as a part of the purifying chamber 57 between the element supporting wall portion 48b and the cleaner case 46A as clearly shown in FIG. 9.

The cleaner element 50 for covering the opening 61 from the non-purifying chamber 56 side is formed into a plate shape while striding over the first and second case half bodies 48, 49A, and the cleaner element 50 is supported by the element supporting wall portion 48b while directing an air flowing direction 62 passed through the cleaner element 50, along the vehicle body longitudinal direction.

The cleaner element 50 is supported by an element supporting frame 63. The element supporting frame 63 is formed to have a supporting cylindrical portion 63a and a flange portion 63b. The supporting cylindrical portion 63a is formed into a rectangular shape while fitting a part of the supporting cylindrical portion 63a into the opening 61, the cleaner element 50 being stored and supported in the supporting cylindrical portion 63a. The flange portion 63b overhangs to a lateral side from the supporting cylindrical portion 63a so as to abut against the element supporting wall portion 48b through an endless seal member 64 on the non-purifying chamber 56 side.

The cleaner element 50 is covered with a metal plate 66 and a mesh member 67 from the purifying chamber 57 side. The meal plate 66 is formed with a plurality of circulation holes 65, and abuts against an end portion on the purifying chamber 57 side of the supporting cylindrical portion 63a of the element supporting frame 63. The mesh member 67 abuts against the plate 66 from the purifying chamber 57 side. A peripheral edge portion of the mesh member 67 is clamped by a bent portion 66a on the peripheral edge portion of the plate 66. In addition, the peripheral edge portion of the plate 66 is fixed to the element supporting frame 63 by swaging and coupling a plurality of protrusion portions 63c provided integrally with the supporting cylindrical portion 63a of the element supporting frame 63.

The element supporting frame 63 can be inserted and removed by being slid in the vehicle width direction in the first case half body 48 of the cleaner case 46A with the cleaner element insertion/removal port 52 opened. In addition, locking portions 69 are provided to the element supporting wall portion 48b, and engagement protruding portions 68 are individually engaged with the locking portions 69 from the cleaner element insertion/removal port 52 side. The engagement protruding portions 68 are provided in two positions of the upper portion of the element supporting frame 63 at intervals in the vehicle width direction. Also, engagement portions 71 are protuberantly provided integrally with the first case half body 48 so as to be positioned on the peripheral edge portion of the cleaner element insertion/removal port 52. The engagement portions 71 protrude toward the cleaner element insertion/removal port 52 side so that engaging locking claws 70 provided in two positions of a lower portion of the element supporting frame 63 at intervals in the vehicle width direction are disengageably engaged with the engagement portions 71.

The cleaner element insertion/removal port 52 is closed by a cover member 72 detachably attached to the first case half body 48. Locking portions 74 respectively having locking holes 73 are provided integrally in two positions so as to protrude downward. The two positions are located on a lower edge portion side of the cleaner element insertion/removal port 52, and are located at intervals in the vehicle body longitudinal direction of the first case half body 48. Engagement protruding portions 75 respectively engaged with the locking holes 73 are provided integrally with the lower portion of the cover member 72. Also, engagement protruding portions 76 are integrally provided to two positions so as to protrude upward. The two positions are located on an upper edge portion side of the cleaner element insertion/removal port 52, and are located at intervals in the vehicle body longitudinal direction of the first case half body 48. Locking portions 78 having locking holes 77 engaging the engagement protrusion portions 76 therewith are provided integrally with an upper portion of the cover member 72 so as to protrude to the first case half body 48 side. Also, a fastening plate portion 72a is provided integrally with the cover member 72. The fastening plate portion 72a abuts against the first case half body 48 on a front edge portion side of the cleaner element insertion/removal port 52. The fastening plate portion 72a is fastened to the first case half body 48 by a screw member 79. That is, the cover member 72 is fastened to the first case half body 48 by the screw member 79 with the engagement protruding portions 75 engaged with the locking holes 73 of the first case half body 48 and the engagement protruding portions 76 of the first case half body 48 engaged with the locking holes 77.

A storage recessed portion 80 recessed inward is formed in an outer surface of the cover member 72. A vehicle auxiliary machine, for example, a fuse box 81 is stored and retained in the storage recessed portion 80.

In the meantime, as clearly shown in FIG. 4, the pair of right and left seat sub-frames 17 as frame members configuring a part of the vehicle body frame F extends in the vehicle body longitudinal direction while being located close to each other above the cleaner case 46A, and a pair of frame relief recessed portions 84 are formed in an upper surface of the cleaner case 46A, the pair of frame relief recessed portions 84 storing at least a part (a part in the embodiment) of a portion of the pair of seat sub-frames 17 arranged above the cleaner case 46A.

A wire harness relief recessed portion 86 is formed in the upper surface of at least one of the first and second case half bodies 48, 49A, in the upper surface of the first case half body 48 in the embodiment. The wire harness relief recessed portion 86 stores a part of the wire harness 85 while allowing passage of a part of the wire harness 85 between the first case half body 48 and at least one of the pair of right and left seat sub-frames 17 (the left seat sub-frame 17 in the embodiment).

Further, the cleaner case 46A is arranged in front of the battery box 87 in the vehicle body longitudinal direction, the battery box 87 being mounted within the vehicle body frame F. The recessed portion 55 arranged behind the cleaner case 46A is covered with the battery box 87 from a rear side.

Figure 11:
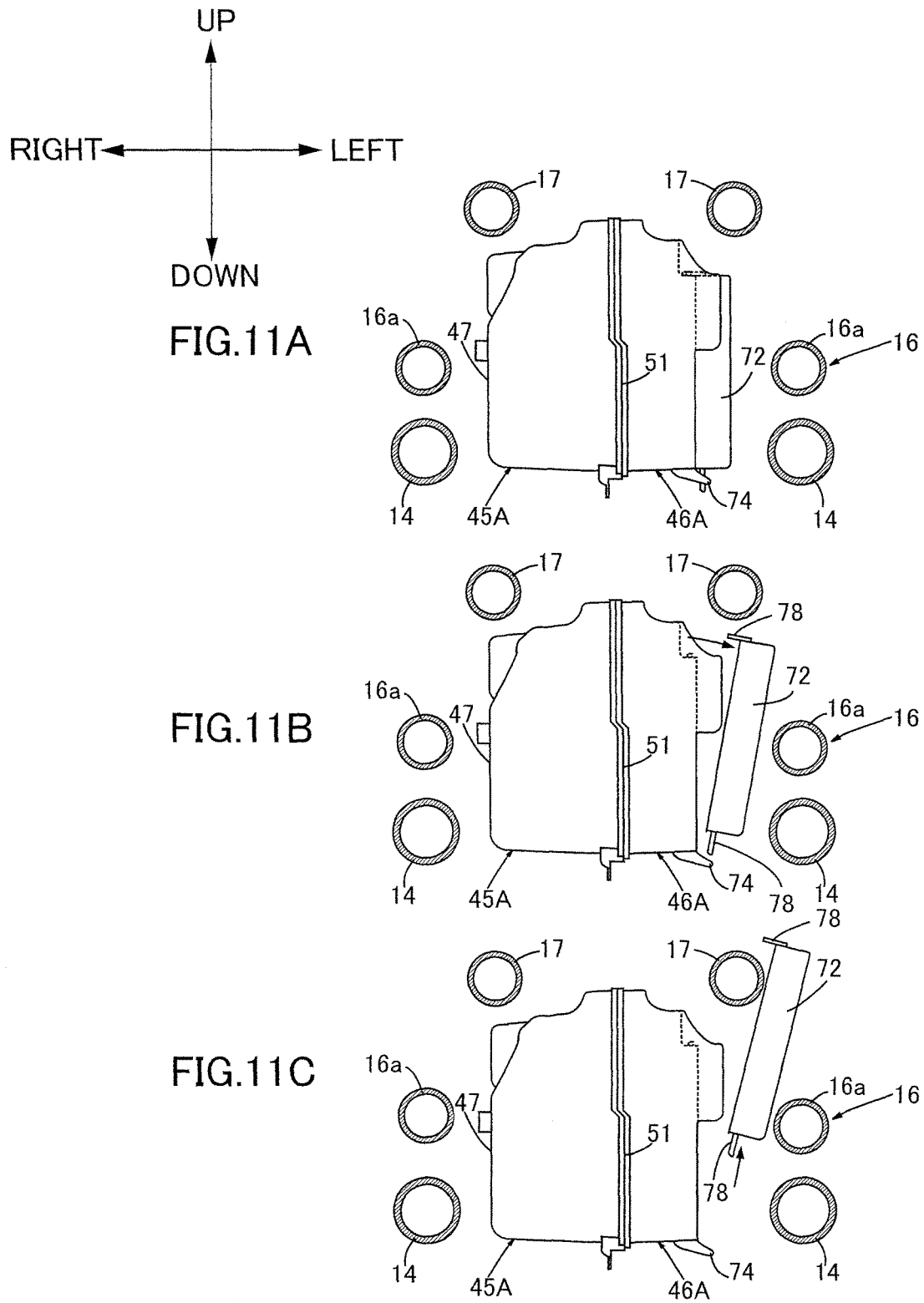
FIGS. 11A to 11C are each a longitudinal sectional elevation view along line 11-11 in FIG. 4 and show sequentially procedures for detaching the cover member.

In the meantime, as shown in FIG. 11A, with the cover member 72 attached to the cleaner case 46A so as to close the cleaner element insertion/removal port 52, a lower portion of the left main frame 14 included in the vehicle body frame F exists outward of the lower portion of the cover member 72, a part of the left lateral pipe 16a of the seat frame 16 exists outward of the intermediate portion of the cover member 72 in an up-down direction, and a part of the left seat sub-frame 17 exists above the cover member 72. In this state, when the cover member 72 is detached from the cleaner case 46A, as shown in FIG. 11B, with the screw member 79 (see FIG. 3) loosened, the cover member 72 is slightly moved upward while the upper portion of the cover member 72 takes an inclined posture so as to be positioned outward in the vehicle width direction, so that the engagement protruding portions 76 of the first case half body 48 are disengaged from the locking holes 77 formed in the upper portion of the cover member 72 and also the engagement protruding portions 75 of the lower portion of the cover member 72 are disengaged from the locking holes 73 formed in the first case half body 48. Further, as shown in FIG. 11C, the cover member 72 have only to be extracted so as to be passed between the left lateral pipe 16a and the left seat sub-frame 17.

Next, an operation of the first embodiment will be described. The cleaner case 46A for the air cleaner 45A is configured with the first and second case half bodies 48, 49A coupled to each other while being arranged in the vehicle width direction. The first case half body 48 of the first and second case half bodies 48, 49A is provided with the cleaner element insertion/removal port 52 opened outward so that the cleaner element 50 can be inserted into and removed from the cleaner element insertion/removal port 52 , the purified air outlet 53 connected with the connecting tube 44 for leading the purified air to the engine body 27A side, and the outside air suction port 54 configured to introduce the air from the outside into the cleaner case 46A. For this reason, the present invention can contribute to an improvement in engine performance by enhancing the degree of freedom in arrangement and a shape of the passage for leading the purified air to the engine body 27A side while facilitating inserting and removing work of the cleaner element 50 from the vehicle lateral side and avoiding the complication of the structure of the cleaner case 46A.

Also, the rear portion of the first case half body 48 in the vehicle body longitudinal direction is provided with the enlarged portion 48a enlarged to the second case half body 49A side so that the rear portion of the joint portion 51 for the first and second case half bodies 48, 49A is formed into the substantially L-shaped bent portion 51a as seen in the plan view. The outside air suction port 54 is provided in the bottom surface of the recessed portion 55 formed in the enlarged portion 48a while being opened rearward and upward in the vehicle body longitudinal direction. For this reason, the outside air suction port 54 can be protected by the vehicle body frame F and the cleaner case 46A itself, and also the intake noise can be reduced by increasing the volume of the non-purifying chamber 56 placed farther upstream of the cleaner element 50 in the cleaner case 46A.

Also, the cleaner element 50 striding over the first and second case half bodies 48, 49A is stored in the cleaner case 46A so that a part of the non-purifying chamber 56 is formed in the enlarged portion 48a. For this reason, the large cleaner element 50 striding over the first and second case half bodies 48, 49A can be used, and the present invention can contribute to an improvement in service life of the cleaner element 50.

Also, the element supporting wall portion 48b is provided integrally with the first case half body 48 of the first and second case half bodies 48, 49A so that a part of the element supporting wall portion 48 is projected into the second case half body 49A, the element supporting wall portion 48b supporting the cleaner element 50. The cleaner element 50 is formed into the plate shape so as to direct the air flowing direction 62 along the vehicle body longitudinal direction with the cleaner element 50 supported by the element supporting wall portion 48b of the cleaner case 46A, the cleaner case 46A being mounted within the vehicle body frame F. The purifying chamber space 57a having the substantially L-shaped cross-section is formed between the element supporting wall portion 48b and the cleaner case 46A, the purifying chamber space 57a functioning as a part of the purifying chamber 57 formed in the cleaner case 46A on the downstream side of the cleaner element 50. For this reason, air suction performance can be improved by ensuring the volume of the purifying chamber 57 while ensuring the sealability between the cleaner element 50 and the cleaner case 46A.

Also, the storage recessed portion 80 is formed in the outer surface of the cover member 72 while being recessed inward, the cover member 72 being detachably attached to the first case half body 48 so as to close the cleaner element insertion/removal port 52, the storage recessed portion 80 being configured to store and retain the fuse box 81 therein. For this reason, the rigidity of the cover member 72 can be ensured, and also the vehicle body can be miniaturized while suppressing protrusion of the fuse box 81 in the vehicle width direction.

Also, the pair of right and left seat sub-frames 17 extends in the vehicle longitudinal direction, the pair of right and left seat sub-frames 17 configuring a part of the vehicle body frame F and also being arranged to approach each other above the cleaner case 46A. The upper surface of the cleaner case 46A is formed with the pair of frame relief recessed portions 84, the pair of frame relief recessed portions 84 storing at least a part of the portion of the pair of seat sub-frames 17, the portion thereof being arranged above the cleaner case 46A. For this reason, the seat sub-frames 17 can be arranged close to the cleaner case 46A, and the riding comfortableness can be improved while ensuring striding performance for the rider.

Also, the upper surface of at least one of the first and second case half bodies 48, 49A (the first case half body 48 in the embodiment) is formed with the wire harness relief recessed portion 86, the wire harness relief recessed portion 86 storing a part of the wire harness 85 while allowing passage of a part of the wire harness 85 between the first case half body 48 and at least one of the pair of seat sub-frames 17 (one of the seat sub-frames 17 in the embodiment). For this reason, the seat sub-frames 17 can be arranged closer to the cleaner case 46A while ensuring the space for passing the wire harness 85 therethrough, and the riding comfortableness can be further improved while ensuring the striding performance for the rider.

Further, the cleaner case 46A is arranged in front of the battery box 87 in the vehicle longitudinal direction so as to cover the recessed portion 55 by the battery box 87 from the rear side, the battery box 87 being mounted within the vehicle body frame F. For this reason, intake noise generation can be suppressed by shielding, by the battery box 87, the intake noise emitted from the outside air suction port 54 formed in the bottom portion of the recessed portion 55.

A second embodiment of the present invention will be described with reference to FIG. 12 and FIG. 13. The same reference signs are applied to the portions corresponding to the above-described first embodiment. The corresponding portions are only shown in the drawings, and detailed explanation thereof will be omitted.

Figure 12:
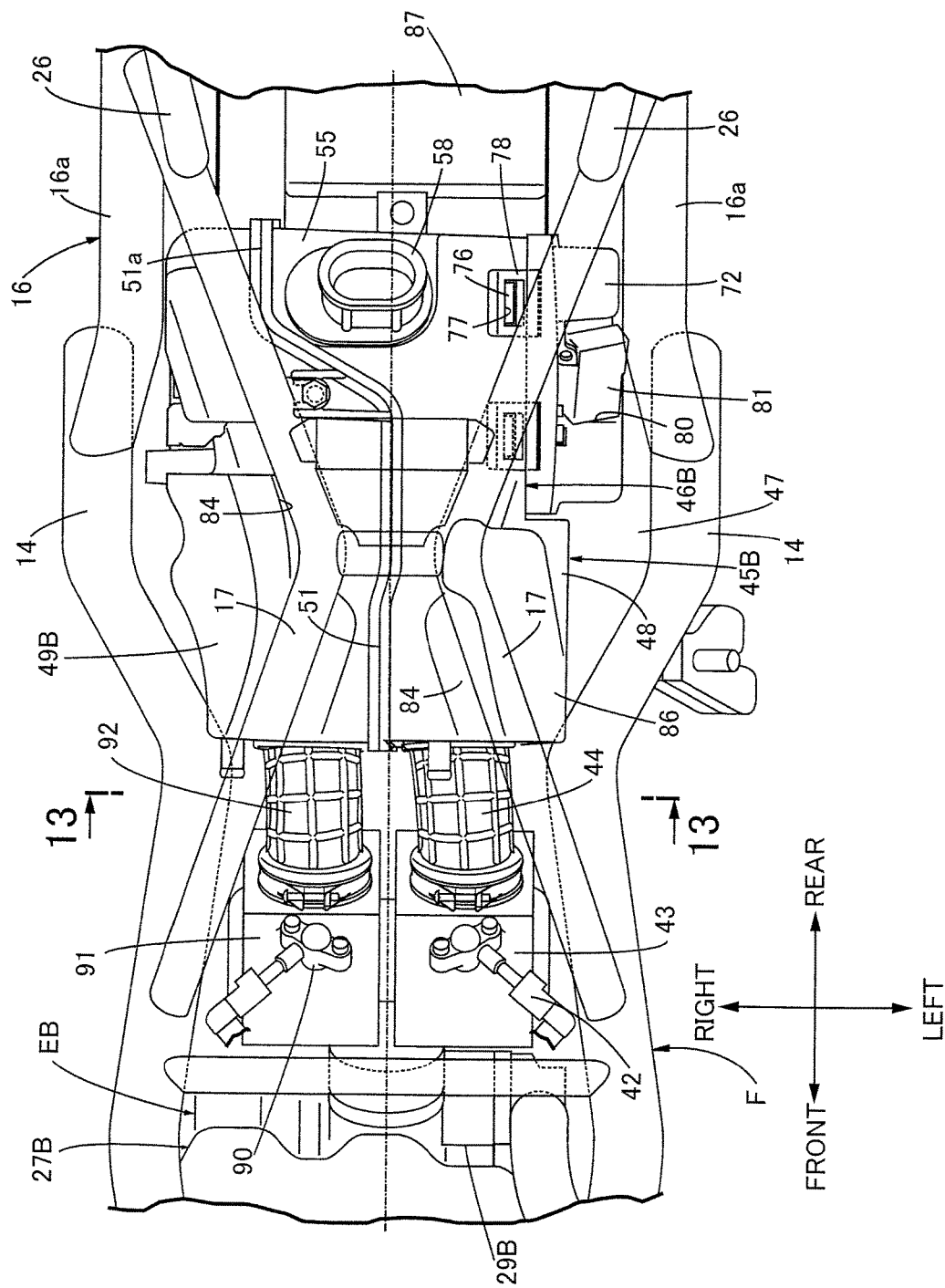
FIG. 12 is a plan view of a second embodiment, corresponding to FIG. 4.

Firstly, in FIG. 12, a rear lateral wall of a cylinder head 29B of an engine body 27B of a two cylinder engine EB mounted in a vehicle body frame F is connected with a first throttle body 43 having a fuel injection valve 42 and a second throttle body 91 having a fuel injection valve 90, the first throttle body 43 and the second throttle body 91 individually corresponding to respective cylinders. The first throttle body 43 is connected to an air cleaner 45B through a first connecting tube 44, and the second throttle body 91 is connected to an air cleaner 45B through a second connecting tube 92.

Figure 13:
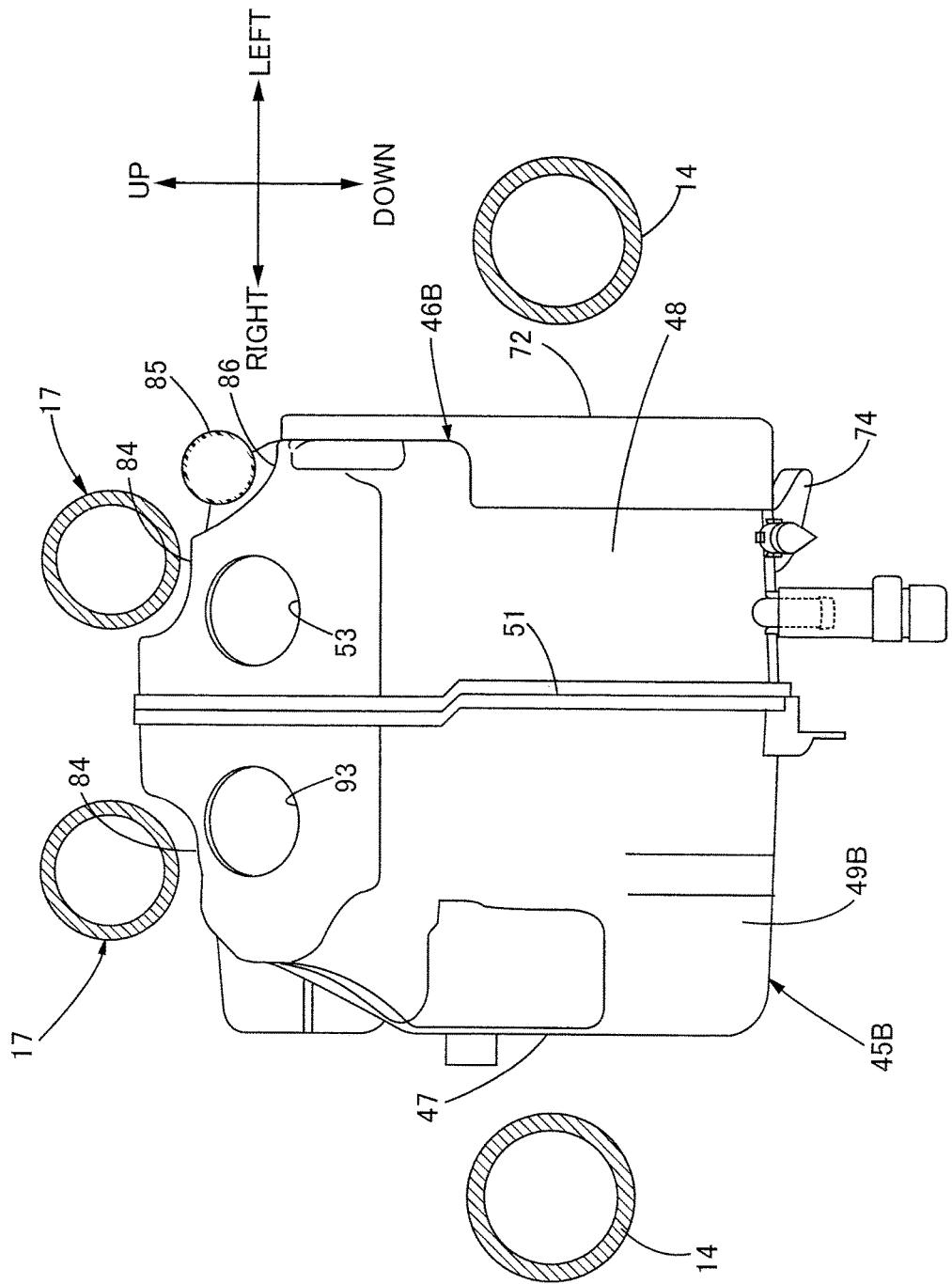
FIG. 13 is a sectional view along line 13-13 in FIG. 12.

With reference to FIG. 13 together, a cleaner case 46B for the air cleaner 45B is configured in such a manner that first and second case half bodies 48, 49B arranged in a vehicle width direction are coupled to each other. In the second embodiment, the synthetic resin first case half body 48 arranged on a left side in the vehicle width direction and the second case half body 49B arranged on a right side in the vehicle width direction are coupled to each other by frictionally joining opposed edge portions of the case half bodies 48, 49B to each other.

A first purified air outlet 53 connected with the first connecting tube 44 is formed in a front end surface of the first case half body 48, and a second purified air outlet 93 connected with the second connecting tube 92 is formed in a front end surface of the second case half body 49B.

With the second embodiment, the cleaner case 46B is configured in such a manner that the second case half body 49B formed with the second purified air outlet 93 is joined to the first case half body 48 while the first case half body 48 used for a single cylinder engine EA is left as it is. For this reason, the present invention can be easily applied to a two cylinder engine EB.

Embodiments of the present invention are explained above, but the present invention is not limited to the above-mentioned embodiments and may be modified in a variety of ways as long as the modifications do not depart from the gist of the present invention.

What is claimed is:

1. An air cleaner structure in a saddle-ride type vehicle, the saddle-ride type vehicle comprising a vehicle body frame, an air cleaner and an engine body, the air cleaner and the engine body being mounted within the vehicle body frame, the air cleaner having a cleaner element stored in a cleaner case, the cleaner case being configured with first and second case half bodies coupled to each other and arranged in a vehicle width direction, the cleaner case being arranged in a space surrounded by the vehicle body frame, the engine body being at least partially arranged in front of the air cleaner in a vehicle longitudinal direction, wherein the first case half body of the first and second case half bodies is provided with a cleaner element insertion/removal port, a purified air outlet, and an outside air suction port, the cleaner element insertion/removal port being opened outward so that the cleaner element can be inserted into and removed from the cleaner element insertion/removal port, the purified air outlet being connected with a connecting tube for guiding purified air to the engine body side, the outside air suction port configured to introduce air from an outside into the cleaner case, and wherein a rear portion of the first case half body in the vehicle longitudinal direction is provided with an enlarged portion, the enlarged portion being enlarged to the second case half body side.

2. The air cleaner structure in a saddle-ride type vehicle according to claim 1, wherein a rear portion of a joint portion for the first and second case half bodies is formed into a substantially L-shaped bent portion as seen in a plan view, and the outside air suction port is formed in a bottom surface of a recessed portion, the recessed portion being formed in the enlarged portion while being opened rearward and upward in the vehicle longitudinal direction.

3. The air cleaner structure in a saddle-ride type vehicle according to claim 1 or 2, wherein the cleaner element striding over the first and second case half bodies is stored in the cleaner case so that a part of a non-purifying chamber placed farther upstream of the cleaner element is formed in the enlarged portion.

4. The air cleaner structure in a saddle-ride type vehicle according to claim 3, wherein an element supporting wall portion supporting the cleaner element is provided integrally with the first case half body of the first and second case half bodies so that a part of the element supporting wall portion is projected into the second case half body, the cleaner element is formed into a plate shape so as to direct an air flowing direction along the vehicle longitudinal direction with the cleaner element supported by the element supporting wall portion of the cleaner case mounted within the vehicle body frame, and a purifying chamber space having a substantially L-shaped cross-section is formed between the element supporting wall portion and the cleaner case, the purifying chamber space functioning as a part of a purifying chamber formed in the cleaner case on a downstream side of the cleaner element.

5. The air cleaner structure in a saddle-ride type vehicle according to claim 1 or 2,
- wherein a second purified air outlet is formed in the second case half body, and
- a second connecting tube is connected to the second purified air outlet, the second connecting tube leading the purified air toward a multiple cylinder engine body.

6. An air cleaner structure in a saddle-ride type vehicle, the saddle-ride type vehicle comprising a vehicle body frame, an air cleaner and an engine body, the air cleaner and the engine body being mounted within the vehicle body frame, the air cleaner having a cleaner element stored in a cleaner case, the cleaner case being configured with first and second case half bodies coupled to each other and arranged in a vehicle width direction, the cleaner case being arranged in a space surrounded by the vehicle body frame, the engine body being at least partially arranged in front of the air cleaner in a vehicle longitudinal direction,
- wherein the first case half body of the first and second case half bodies is provided with a cleaner element insertion/removal port, a purified air outlet, and an outside air suction port, the cleaner element insertion/removal port being opened outward so that the cleaner element can be inserted into and removed from the cleaner element insertion/removal port, the purified air outlet being connected with a connecting tube for guiding purified air to the engine body side, the outside air suction port configured to introduce air from an outside into the cleaner case,
- wherein a storage recessed portion is formed in an outer surface of a cover member while being recessed inward, the cover member being detachably attached to the first case half body so as to close the cleaner element insertion/removal port, the storage recessed portion being configured to store and retain a vehicle auxiliary machine therein.

7. The air cleaner structure in a saddle-ride type vehicle according to claim 2,
- wherein a part of the vehicle body frame is configured with a pair of frame members, the pair of frame members extending in the vehicle longitudinal direction while being arranged to approach each other above the cleaner case, and
- an upper surface of the cleaner case is formed with a pair of frame relief recessed portions, the pair of frame relief recessed portions storing at least a part of a portion of the pair of frame members, the portion thereof being arranged above the cleaner case.

8. The air cleaner structure in a saddle-ride type vehicle according to claim 7,
- wherein an upper surface of at least one of the first and second case half bodies is formed with a wire harness relief recessed portion, the wire harness relief recessed portion storing a part of a wire harness while allowing passage of a part of the wire harness between at least one of the first and second case half bodies and at least one of the pair of frame members.

9. The air cleaner structure in a saddle-ride type vehicle according to claim 2,
- wherein the cleaner case is arranged in front of a battery box in the vehicle longitudinal direction so that the recessed portion is covered by the battery box from a rear side, the battery box being mounted within the vehicle body frame.

* * * * *